(12) United States Patent
Heintzelman

(10) Patent No.: US 10,976,633 B2
(45) Date of Patent: Apr. 13, 2021

(54) CONDUCTIVE BUS BAR WITH DARK OR COLORED APPEARANCE

(71) Applicant: GENTEX CORPORATION, Zeeland, MI (US)

(72) Inventor: Adam R. Heintzelman, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/595,542

(22) Filed: Oct. 8, 2019

(65) Prior Publication Data

US 2020/0110321 A1 Apr. 9, 2020

Related U.S. Application Data

(60) Provisional application No. 62/743,187, filed on Oct. 9, 2018.

(51) Int. Cl.
*H05K 1/00* (2006.01)
*G02F 1/155* (2006.01)
*G02F 1/161* (2006.01)

(52) U.S. Cl.
CPC ............. *G02F 1/155* (2013.01); *G02F 1/161* (2013.01)

(58) Field of Classification Search
USPC ......................................................... 361/748
See application file for complete search history.

(56) References Cited

U.S. PATENT DOCUMENTS

| 6,404,532 B1 | 6/2002 | Berneth et al. |
| 6,449,082 B1 * | 9/2002 | Agrawal ................. G02F 1/155 |
| | | 250/214 SG |
| 9,158,172 B2 | 10/2015 | Sbar et al. |

FOREIGN PATENT DOCUMENTS

| JP | 2015/190047 | * | 6/2014 |
| WO | 2015190047 A1 | | 6/2014 |

OTHER PUBLICATIONS

International Search Report dated Dec. 19, 2019, for corresponding PCT application No. PCT/US2019/055085, 2 pages.
Written Opinion of the International Searching Authority dated Dec. 19, 2019, for corresponding PCT application No. PCT/US2019/055085, 5 pages.

* cited by examiner

*Primary Examiner* — Andargie M Aychillhum
(74) *Attorney, Agent, or Firm* — Price Heneveld LLP; Bradley D. Johnson

(57) ABSTRACT

An electro-optic device comprises a first substrate having a rear surface and a second substrate having a front surface opposed to the rear surface of the first surface; a cavity defined between the opposed rear surface of the first substrate and the front surface of the second substrate; a sealing member bonding first substrate and second substrate together in a spaced apart relationship; and a bi-level bus bar assembly comprising a first layer and a second layer, and disposed between the first and second substrates. The bi-level bus bar assembly extends along at least a portion of a perimeter of the electro-optic device.

18 Claims, 3 Drawing Sheets

CONDUCTIVE BUS BAR WITH DARK OR COLORED APPEARANCE

CROSS REFERENCE TO RELATED APPLICATIONS

This application claims the benefit of and priority to U.S. Provisional Patent Application No. 62/743,187, filed on Oct. 9, 2018, entitled Conductive Bus Bar with Dark or Colored Appearance, the entire disclosure of which is hereby incorporated herein by reference.

FIELD OF THE DISCLOSURE

This disclosure relates generally to bus bars for electro-optic devices and, in particular, to bus bars for electro-optic devices, the bus bars having a dark or colored appearance.

BACKGROUND

Current electro-optic devices may comprise a conductive epoxy or other conductive material disposed along at least a portion of an edge of the electro-optic device between the first and second substrates to form an electrical bus. The bus bar may be hidden behind a bezel or a chrome ring. However, in some circumstances, such as in a heads up display, a bezel or chrome ring cannot be used or may not be aesthetically desirable. In that case, the bus bar may be visible through the surface of the electro-optic device.

SUMMARY

According to an aspect of the present disclosure, an electro-optic device may comprise a first substrate having a rear surface and a second substrate having a front surface opposed to the rear surface of the first surface; a cavity defined between the opposed rear surface of the first substrate and the front surface of the second substrate; a sealing member bonding first substrate and second substrate together in a spaced apart relationship. A bi-level bus bar assembly may comprise a first layer and a second layer, and may be disposed between the first and second substrates. The bi-level bus bar assembly may extend along at least a portion of a perimeter of the electro-optic device. The first layer of the bus bar assembly may comprise an opaque or translucent material having a dark or colored appearance; and the second layer of the bus bar assembly may comprise a conductive material. The first layer may comprise carbon black. The electro-optic device further may comprise an electrode coating disposed on the rear surface of the first substrate. The electrode coating may not extend beyond the sealing member to the bus bar assembly. The sealing member may extend along a perimeter of first substrate and second substrate; and the bi-level bus bar assembly may be disposed adjacent to the sealing member.

According to an aspect, an electro-optic device may comprise a first substrate having a front surface and a rear surface and a second substrate having a front surface opposed to the rear surface of the first surface; a cavity defined between the opposed rear surface of the first substrate and the front surface of the second substrate; and a bi-level bus bar assembly disposed between and along at least a portion of a perimeter of the first and second substrates. The bi-level bus bar assembly may comprise a first layer of a dark or colored material and a second layer may comprise a sealing portion and a conductive portion. The dark or colored material may be a conductive or semi-conductive material. The dark or colored material may comprise carbon black. The sealing portion may be disposed between the cavity and the conductive portion. In some embodiments, the electro-optic device further may comprise an electrode coating disposed on the rear surface of the first substrate; wherein the electrode coating extends only to about the first layer of the bus bar assembly. In some embodiments, the electro-optic device further may comprise an electrode coating; wherein the electrode coating may be disposed on the rear surface of the first substrate and extends between the layer of dark or colored material and the second layer of the bi-level bus bar assembly.

According to an aspect, an electro-optic device may comprise a first substrate having a front surface and a rear surface and a second substrate having a front surface opposed to the rear surface of the first surface; a cavity defined between the opposed rear surface of the first substrate and the front surface of the second substrate; a sealing member bonding first substrate and second substrate together in a spaced apart relationship; a bus bar disposed between and along at least a portion of a perimeter of the first and second substrates; and an opaque material disposed on the front surface of the first substrate, the opaque material disposed to coincide with and overlay the bus bar.

According to an aspect, an electro-optic device may comprise a first substrate having a front surface and a rear surface and a second substrate having a front surface opposed to the rear surface of the first surface; a cavity defined between the opposed rear surface of the first substrate and the front surface of the second substrate; a sealing member bonding first substrate and second substrate together in a spaced apart relationship; and a bus bar disposed between and along at least a portion of a perimeter of the first and second substrates. The bus bar may comprise a sufficient amount of a dark or colored conductive or semi-conductive material to make bus bar appear dark or colored. The dark or colored material may be carbon black. The dark or colored material may be a dielectric.

According to an aspect, a busbar assembly for an electro-optic device may comprise a first layer and a second layer; wherein the first layer may comprise a conductive or semi-conductive dark or colored material; and wherein the second layer may comprise a conductive material.

DETAILED DESCRIPTION

In many current electro-optic devices, the bus bar may comprise a silver epoxy or other light-colored or reflective material. This may make the bus bar appear light in appearance, reflective, or both. Visible, light-colored bus bars in electro-optic devices may be visually unappealing to viewers. This may be especially true in electro-optic heads up displays having no bezel or other ornamentation around the perimeter of the electro-optic device that would prevent viewers from seeing the bus bar. Furthermore, reflective bus bars in electro-optic devices may be distracting to viewers. Bus bars having a dark or colored appearance may be more aesthetically pleasing to viewers. The present disclosure provides bus bars that may have an improved aesthetic appearance.

Figure 1:
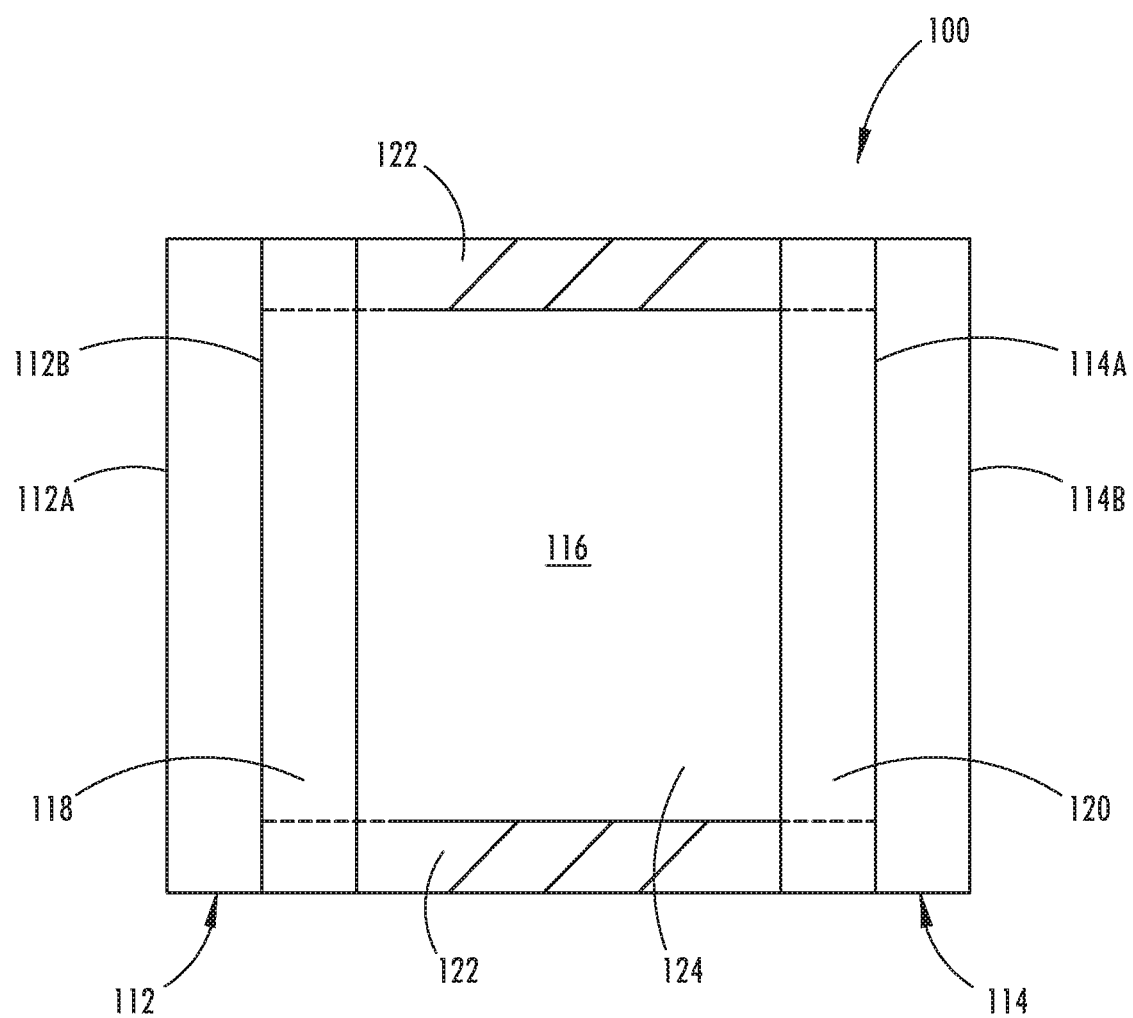
FIG. 1 illustrates a cross-sectional schematic representation of a top view of a first arrangement of an electro-optic device having a bus bar in accordance with the present disclosure.

FIG. 1 shows a schematic representation of an electro-optic (EO) device 100. EO device 100 generally comprises a first substrate 112 having a front surface 112A and a rear surface 112B, and a second substrate 114 having a front surface 114A and a rear surface 114B. A sealing member 122 may extend between first and second substrates 112, 114 along at least a portion of a perimeter of EO device 100. A chamber 116 for containing electro-optic medium 124 may be defined by rear surface 112B of first substrate 112, the opposed front surface 114A of second substrate 114, and sealing member 122. As shown in the figures, first substrate 112 may be closer to the viewer than second substrate 114.

One or more layers of electrically conductive material or electrode coatings 118 may be associated with rear surface 112B of first substrate 112. These layers may serve as a first electrode for electro-optic device 100. Similarly, one or more layers of electrically conductive material or electrode coatings 120 may be associated with and disposed on front surface 114A of second substrate 114 and may operate as a second electrode for electro-optic device 100. Electrode coating 118 may be a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within electro-optic device 100 or the atmosphere; and (e) exhibits minimal diffusion or specular reflectance as well as sufficient electrical conductance. Electrode coating 118 may be fabricated from fluorine doped tin oxide (FTO), indium/tin oxide (ITO), doped zinc oxide or other materials known to those having ordinary skill in the art.

In some embodiments of the present disclosure, as shown in FIGS. 2A-4, an electro-optic device 100 may comprise a bus bar assembly 128 having a dark or colored appearance. Bus bar assembly 128 may also be non-reflective.

Figure 2A:
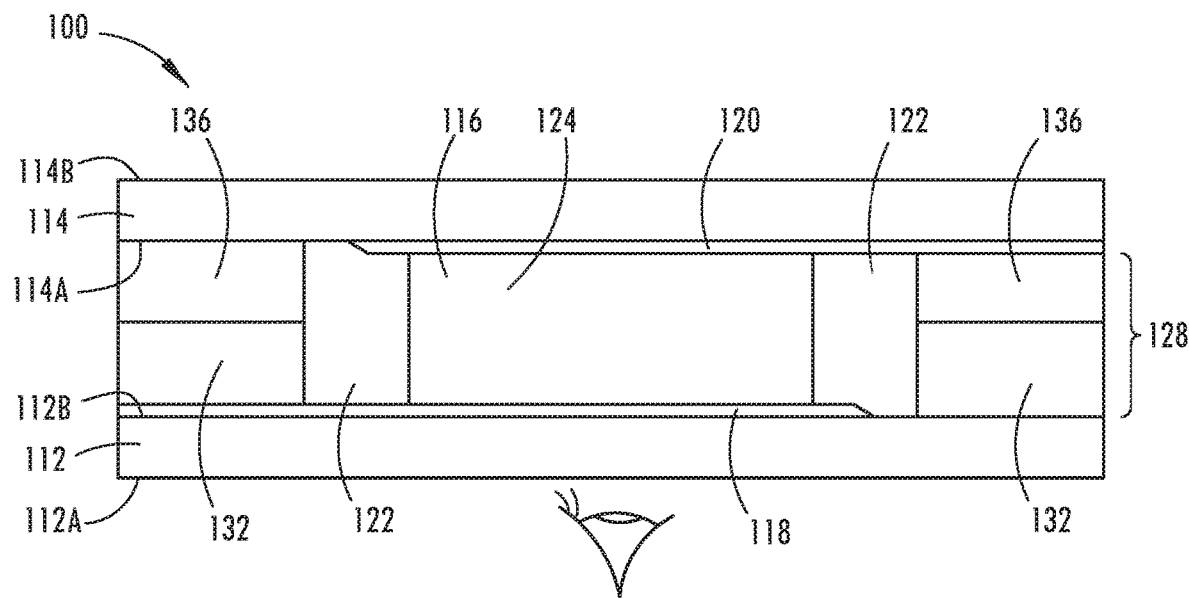
FIG. 2A illustrates a cross-sectional schematic representation of a side view of a first example of a first arrangement of an electro-optic device in accordance with the present disclosure.

In some embodiments, as shown in FIG. 2A, bus bar assembly 128 may be disposed between first and second substrates 112, 114, and may extend along at least a portion of the perimeter of EO device 100. In some embodiments, bus bar assembly 128 may be disposed adjacent sealing member 122 such that sealing member 122 is disposed between bus bar assembly 128 and chamber 116.

In some embodiments, bus bar assembly 128 may comprise a bi-level bus bar assembly 128 comprising a first layer 132 of a first material and a second layer 136 of a second material. In some embodiments, first layer 132 may be disposed on first substrate 112, while second layer 136 may be on second substrate 114. Bus bar assembly 128 may be configured to be viewed by a viewer such that first substrate 112 is closer to the viewer than second substrate 114. Thus, first layer 132 may be between the viewer and second layer 136. In some embodiments, first layer 132 may be opaque, thereby blocking second layer 136 from being seen by the viewer.

In some embodiments, second layer 136 of bi-level bus bar assembly 128 may comprise a conductive material. In some embodiments, second layer 136 may comprise a conductive wire or tape. In some embodiments, second layer 136 may comprise at least one metallic strip that may be fastened to at least one of first and second substrate 112, 114. In some embodiments, second layer 136 may comprise a conductive material and at least one of a conductive wire or tape. The at least one of a conductive wire or tape may be embedded in the conductive material. The conductive material of second layer 136 may comprise, for example, a silver epoxy, silver or other conductive ink, metal-containing thermoplastic or thermosetting polymers, metal oxides, conductive pressure sensitive adhesive (PSA), or an epoxy comprising conductive particles, flakes, or fibers made of materials such as silver, gold, copper, nickel, or carbon. Other suitable materials for second layer 136 include chromium, stainless steel, titanium, and alloys of chromium/molybdenum/nickel, molybdenum, and nickel-based alloys. Second layer 136 may have a light appearance and/or may be reflective. Users may find the light appearance or reflectivity of second layer 136 to be aesthetically unpleasing.

In some embodiments, first layer 132 of bi-level bus bar assembly 128 may be an opaque or a translucent material having a desired appearance. For example, the desired appearance may be a dark appearance, such as a black appearance. In some embodiments, first layer 132 may comprise material that has appreciable absorption of the visible spectrum, and may therefore appear dark. In some embodiments, first layer 132 may be a dielectric coating. In some embodiments, the desired appearance may be a colored appearance, such as red or blue. In some embodiments, first layer 132 may be conductive or semi-conductive. First layer 132 may comprise, for example, carbon black or carbon ink, alone or in combination with other suitable materials such as, for example, metal epoxies. Placing the dark or colored opaque first layer 132 of the bi-level bus bar assembly 128 between the viewer and second layer 136 may block the viewer from seeing second layer 136 or from being distracted by reflections from second material.

Figure 2B:
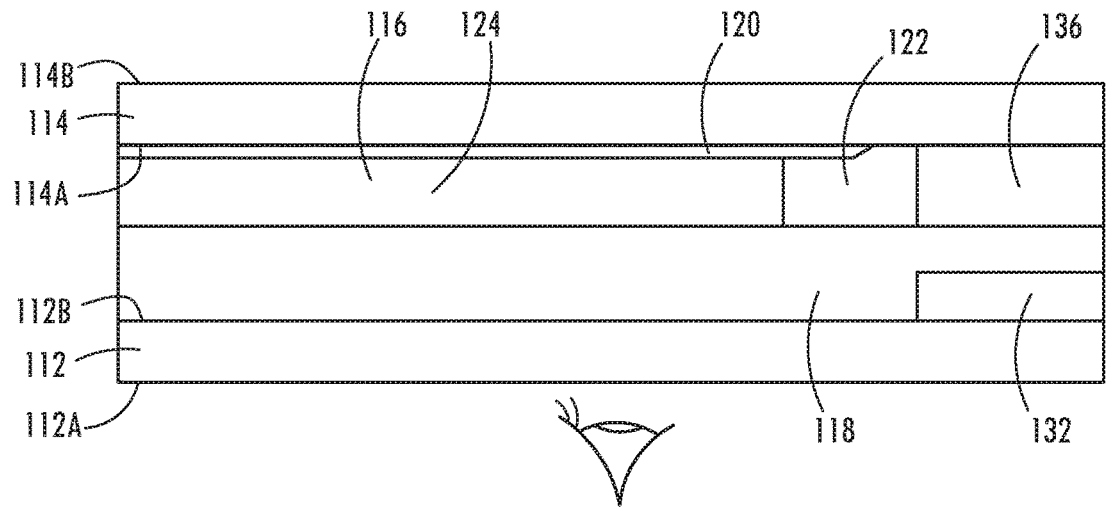
FIG. 2B illustrates a cross-sectional schematic representation of a side view of a second example of a first arrangement of an electro-optic device in accordance with the present disclosure

When viewed through first substrate 112, first layer 132 of bi-level bus bar assembly 128 may appear black to a viewer. However, when first layer 132 is viewed through first substrate 112 and first electrode coating 118, the presence of first electrode coating 118 between first substrate 112 and first layer 132 of bi-level bus bar assembly 128 may cause first layer 132 to appear colored rather than black. This may be aesthetically undesirable. Therefore, in some embodiments, first electrode coating 118 may extend along first substrate 112 to sealing member 122, and may extend at least partially between sealing member 122 and first substrate 112, but may not extend beyond sealing member 122 to bi-level bus bar assembly 128. In some embodiments, first electrode coating 118 may extend along first substrate 112 between sealing member 122 and first substrate 112, and may then extend between first layer 132 and second layer 136 of bi-level bus bar assembly 128 as shown in FIG. 2B.

Figure 3:
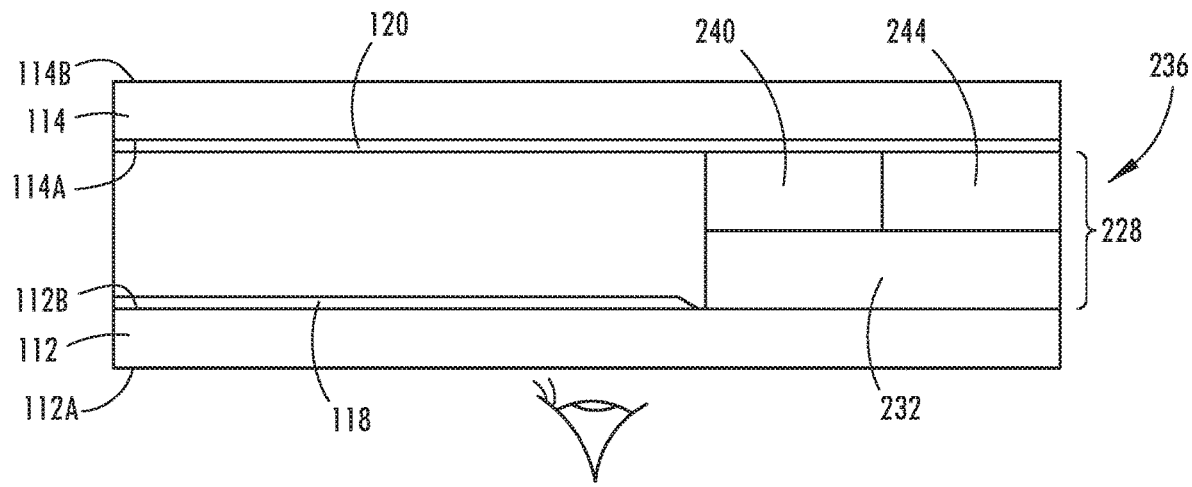
FIG. 3 illustrates a cross-sectional schematic representation of a side view of a second arrangement of an electro-optic device in accordance with the present disclosure.

In some embodiments, as shown in FIG. 3, a bi-level bus bar assembly 228 may extend along at least a portion of the perimeter of EO device 100. Bi-level bus bar assembly 228 may comprise a first layer 232 and a second layer 236. First layer 232 of bi-level bus bar assembly 228 may comprise a conductive or semi-conductive material. The conductive or semi-conductive material of first layer 232 may comprise a dark or colored material. In some embodiments, dark or colored material may comprise, for example, carbon ink or carbon black. In some embodiments, dark or colored material may comprise a conductive or semi-conductive material. In some embodiments, dark or colored material may comprise a dark material such as carbon black. The dark or colored material may be present in sufficient amounts to give first layer 232 the desired color.

In some embodiments, second layer 236 may comprise a sealing portion 240 and a bus bar portion 244. Bus bar portion 244 may comprise an electrically conductive material such as those described previously in relation to second layer 136 of bus bar assembly 128. Bus bar portion 244 of second layer 236 may function as the bus bar for EO device 100. Sealing portion 240 of second layer 236 may comprise a sealing material, and may be disposed along at least a portion of a perimeter of first layer 232 adjacent to bus bar portion 244. In some embodiments, sealing portion 240 may be disposed adjacent bus bar portion 244 such that sealing portion 240 is disposed between bus bar portion 244 and chamber 116.

In some embodiments, electrode coating 118 may extend from rear surface 112B of first substrate 112 and between first layer 232 and second layer 236 of bi-level bus bar assembly 228. This may prevent first layer 232 from appearing colored rather than dark or black.

Figure 4:
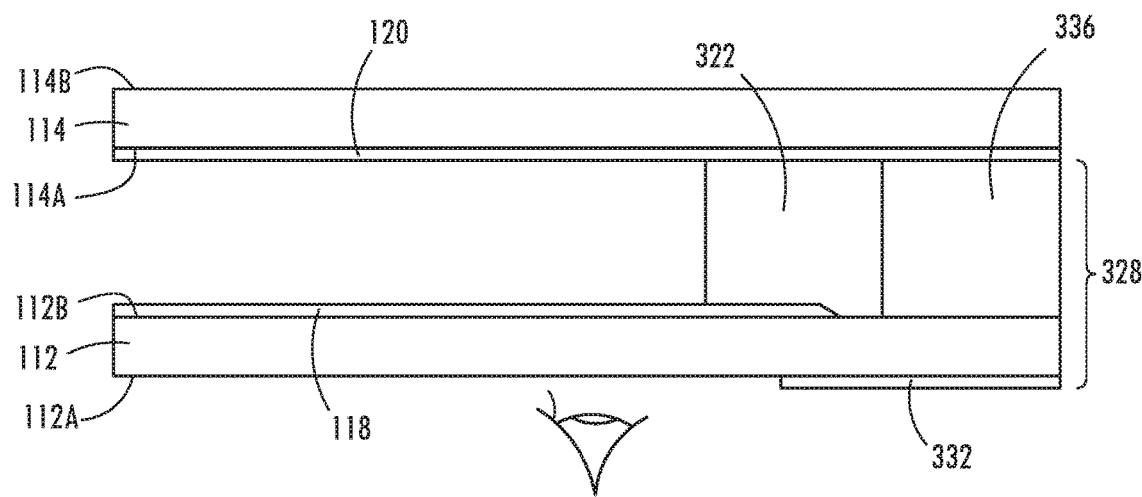
FIG. 4 illustrates a cross-sectional schematic representation of a side view of a third arrangement of an electro-optic device in accordance with the present disclosure.

In some embodiments, as shown in FIG. 4, a bus bar assembly 328 may comprise a bus bar 336 disposed adjacent to sealing member 122. Bus bar 336 may extend between first substrate 112 and second substrate 114. Bus bar 336 may comprise a conductive material such as those described previously in relation to second layer 136 of bus bar assembly 128 of FIG. 2.

In some embodiments, a layer of a dark or colored material 332 may be disposed on front surface 112A of first substrate 112. Layer of dark or colored material 332 may coincide with and overlay bus bar 328. In some embodiments, layer of dark or colored material 332 may be opaque to prevent viewers from seeing bus bar 328. In some embodiments, layer of dark or colored material 332 may be black. In some embodiments, layer of dark or colored material 332 may be sprayed, painted, or inkjet printed onto first substrate 112.

Additionally or alternatively, in some embodiments, bus bar 328 may comprise, in addition to a conductive material, a dark material in sufficient amounts to make bus bar 328 appear black or very dark. Dark material may comprise, for example, carbon ink or carbon black. Dark material may be conductive or semi-conductive. Dark material may be mixed throughout bus bar 328 so that bus bar 328 has a uniform color and appearance.

Sealing member 122 may comprise a sealing material, and may be disposed along at least a portion of a perimeter of first substrate 112 adjacent to bus bar 328. In some embodiments, sealing member 122 may be disposed adjacent bus bar 328 such that sealing member 122 is disposed between bus bar 328 and chamber 116.

Sealing member 122 of EO device 100 may comprise any material that is capable of being adhesively bonded to the electronically conductive materials 118 and 120 or to substrates 112, 114 to seal chamber 116 so that electrochromic medium 124 does not inadvertently leak out of chamber 116. In some embodiments, the layers of electrode coatings 118 and 120 may be partially removed where the sealing member 122 is positioned. If electrode coatings 118 and 120 are not associated with their respective substrates 112, 114, then sealing member 122 preferably bonds well to glass or other substrate material. In some embodiments, sealing member 122 may comprise a silver-doped epoxy. It will be understood that sealing member 122 can be fabricated from any one of a number of materials including, for example, those disclosed in U.S. Pat. Nos. 4,297,401; 4,418,102; 4,695,490; 5,596,023; 5,596,024; 4,297,401; and 6,157,480, all of which are incorporated herein by reference in their entirety.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

In this document, relational terms, such as first and second, top and bottom, front and back, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications.

The invention claimed is:

1. An electro-optic device comprising:
    a first substrate having a rear surface and a second substrate having a front surface opposed to the rear surface of the first surface;
    a sealing member bonding first substrate and second substrate together in a spaced apart relationship;
    a cavity defined between the rear surface of the first substrate and the opposed front surface of the second substrate; and
    a bi-level bus bar assembly comprising a first layer of a first material and a second layer of a second material different from the first material, the bi-level bus bar disposed between the first and second substrates;
    wherein the bi-level bus bar assembly extends along at least a portion of a perimeter of the electro-optic device.

2. The electro-optic device of claim 1, wherein the first layer of the bus bar assembly comprises a material that is one of opaque and translucent, the material having one of a dark and a colored appearance; and
    wherein the second layer of the bus bar assembly comprises a conductive material.

3. The electro-optic device of claim 2, wherein the first layer comprises carbon black.

4. The electro-optic device of claim 1, wherein the first layer of the bus bar assembly is disposed adjacent to the rear surface of the first substrate; and
    wherein the second layer of the bus bar assembly is disposed adjacent to the front surface of the second substrate.

5. The electro-optic device of claim 1, further comprising an electrode coating disposed on the rear surface of the first substrate;
    wherein the electrode coating does not extend beyond the sealing member to the bus bar assembly.

6. The electro-optic device of claim 1, wherein the sealing member extends along a perimeter of first substrate and second substrate; and
    wherein the bi-level bus bar assembly is disposed adjacent to the sealing member.

7. The electro-optic device of claim 1, further comprising an opaque material disposed on the front surface of the first substrate, the opaque material disposed to coincide with and overlay the bus bar.

8. An electro-optic device comprising:
a first substrate having a front surface and a rear surface, and a second substrate having a front surface opposed to the rear surface of the first surface;
a cavity defined between the rear surface of the first substrate and the opposed front surface of the second substrate;
a bi-level bus bar assembly disposed between and along at least a portion of a perimeter of the first and second substrates, the bi-level bus bar assembly comprising a first layer comprising a first material and a second layer comprising a sealing portion and a conductive portion, both the sealing portion and the conductive portion of the second layer in contact with the first layer.

9. The electro-optic device of claim 8, wherein the first material comprises one of a dark material or a colored material.

10. The electro-optic device of claim 8, further comprising an opaque material disposed on the front surface of the first substrate, the opaque material disposed to be at least coextensive with and to overlay the bus bar.

11. The electro-optic device of claim 8, wherein the first material is one of a conductive and a semi-conductive material.

12. The electro-optic device of claim 8, wherein the first material comprises carbon black.

13. The electro-optic device of claim 8, wherein the sealing portion is disposed between the cavity and the conductive portion.

14. The electro-optic device of claim 8, further comprising an electrode coating disposed on the rear surface of the first substrate;
wherein the electrode coating extends only to about the first layer of the bus bar assembly.

15. The electro-optic device of claim 8, further comprising an electrode coating;
wherein the electrode coating is disposed on the rear surface of the first substrate and extends between the layer of the first material and the second layer of the bi-level bus bar assembly.

16. An electro-optic device comprising:
a first substrate having a front surface and a rear surface, and a second substrate having a front surface opposed to the rear surface of the first surface;
a sealing member bonding first substrate and second substrate together in a spaced apart relationship;
a cavity defined between the rear surface of the first substrate and the opposed front surface of the second substrate; and
a bus bar assembly disposed between and along at least a portion of a perimeter of the first and second substrates;
wherein the bus bar assembly comprises a first layer of a first material and a second layer of a second material different from the first material; and
wherein the bus bar assembly further comprises a sufficient amount of a colored conductive or semi-conductive material in the second layer to make the bus bar assembly appear to be about the same color as the colored conductive or semi-conductive material.

17. The electro-optic device of claim 16, wherein the colored conductive or semi-conductive material is carbon black.

18. The electro-optic device of claim 16, further comprising an opaque material disposed on the front surface of the first substrate, the opaque material disposed to coincide with and overlay the bus bar.

* * * * *